United States Patent [19]

Angle

[11] 4,283,160
[45] Aug. 11, 1981

[54] CORRUGATED PIPE FABRICATOR AND INSTALLER DEVICE AND METHODS OF MAKING AND USING THE SAME

[76] Inventor: William M. Angle, 219 N. John, Troy, Mo. 63379

[21] Appl. No.: 18,155

[22] Filed: Mar. 7, 1979

[51] Int. Cl.³ .................. E02D 29/10; E02F 5/10; F16L 1/02
[52] U.S. Cl. .................................... 405/156; 405/174
[58] Field of Search ............... 405/36, 37, 50, 156, 405/154; 242/7.22; 29/455 R, 429; 138/154; 156/466, 467, 446, 195, 391, 392; 72/49, 50

[56] References Cited

U.S. PATENT DOCUMENTS

| | | | |
|---|---|---|---|
| 3,120,107 | 2/1964 | Juusela et al. | 405/156 |
| 3,132,416 | 5/1964 | Hait | 405/156 X |
| 3,193,432 | 7/1965 | Baines | 405/156 X |
| 3,217,500 | 11/1965 | Diamond et al. | 405/156 |
| 3,217,501 | 11/1965 | Boa | 405/156 |
| 3,250,077 | 5/1966 | Ede | 405/156 |
| 3,474,514 | 10/1969 | Lombardi | 29/429 X |
| 3,606,779 | 9/1971 | Parma | 72/49 |
| 4,003,122 | 1/1977 | Overmyer et al. | 405/156 X |

FOREIGN PATENT DOCUMENTS 1231445  5/1971  United Kingdom .................. 405/156

*Primary Examiner*—Dennis L. Taylor

[57] ABSTRACT

The present invention relates to a corrugated pipe fabricator and installer which in its preferred embodiment comprises a conventional mole plow modified to the extent that a sheet of corrugated material which is mounted on a spool mounted on the frame carrying the mole is fed to a rotating shaping cylinder operably mounted coaxially with the mole. The corrugated material is fed at an appropriate angle and forms corrugated pipe in the proccess which is dispensed into the channel formed by the mole.

5 Claims, 7 Drawing Figures

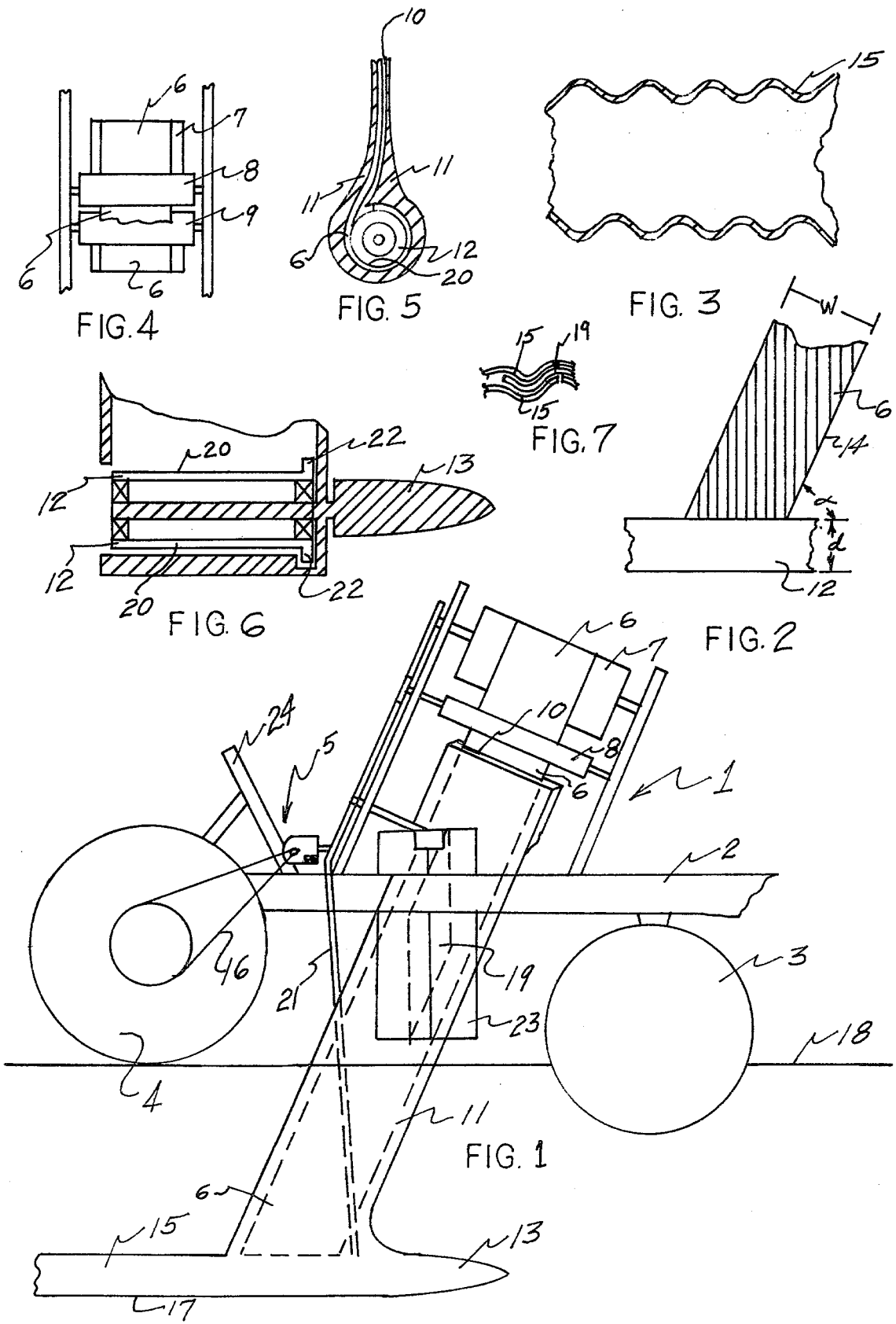

CORRUGATED PIPE FABRICATOR AND INSTALLER DEVICE AND METHODS OF MAKING AND USING THE SAME

THE BACKGROUND OF THE INVENTION

Conventional techniques for installing drainage pipe includes the use of a mole plow to form a channel and then disposing preformed cylindrically shaped corrugated pipe in the channel.

The present method includes transportation of the preformed corrugated pipe which is inefficient because of the low spatial density of the preformed pipe.

Considerable efficiency in shipping space may be accomplished by forming the pipe from flat material at the installation site resulting from shipping the flat corrugated material.

SUMMARY

It is therefore an object of the present invention to provide a corrugated pipe fabricator and installer device which includes means for on site fabrication of cylindrically shaped corrugated pipe directly from flat corrugated material.

An object of the present invention is to provide such a device which allows pipes to be continuously formed underground from spools of corrugated material.

A further object of the present invention is to provide such a device which is simply and economically manufactured and used.

These together with other objects and advantages which will become subsequently apparent, reside in the details and construction and operation as more fully hereinafter described and claimed, reference being had to the accompanying drawings forming a part hereof, wherein like numerals refer to like parts throughout, and in which;

BRIEF DESCRIPTION OF THE DRAWINGS

In the drawings:

FIG. 1 is an elevation view of a corrugated pipe fabricator and installer device constructed in accordance with and embodying the present invention.

FIG. 2 is an elevation view of corrugated sheet material and its relationship to the cylinder used in the device in FIG. 1.

FIG. 3 is a sectional view of typical corrugated pipe.

FIG. 4 is a partial elevation view of a portion of the device in FIG. 1.

FIG. 5 is a sectional view of a portion of the device in FIG. 1.

FIG. 6 is a partial sectional view of the device in FIG. 5.

FIG. 7 is a functional drawing of connection sections of pipe formed by the device in FIG. 1.

DETAILED DESCRIPTION OF THE INVENTION

Referring now in more detail and by reference characters to the drawings which illustrate practical embodiments of the present invention, FIG. 1 is an elevation view of a corrugated pipe fabricator and installer 1, constructed in accordance with, used in and embodying the present invention.

As shown in FIG. 1, device 1, comprises a conventional frame 2, provided with disc cutter 3, drive wheel 4, drive mechanism 5, sheet material 6, wrapped around spool 7, fed between rollers 8, and 9, into the feed slot 10, provided in mole carriage housing 11, to wrapped around cylinder 12, which is rotationally mounted in housing 11. The disc cutter is not an essential item. Mole is rigidly attached to mole carriage housing.

In the preferred embodiment of the invention, as shown in FIG. 2, sheet material 6, is wrapped around a cylinder 12, disposed at an appropriate angle $\alpha$ to the edge 14, of sheet 6. In the preferred embodiment of the invention, this angle and the width of the material are selected such that as material 6, wraps around cylinder 12, it overlaps itself by an amount equal to one-half the width of the sheet material thereby yielding 2 ply pipe. A form of corrugated pipe, single ply, is shown in FIG. 3. As sheet 6, is wound the corrugations interlock to form corrugated pipe 15, shown in FIG. 3. In the preferred embodiment the angle $\alpha$ would be Arctan $\pi$ and the width w would equal twice the diameter d. In this embodiment and in a typical application the diameter could be 4 inches, the width 8 inches and the depth of the corrugations might by $\frac{1}{2}$ inch.

As device 1, moves along the ground, drive wheel 4, imparts drive power by chain 16, to drive mechanism 5, which drives roller 8, and cylinder 12, at a predetermined speed, which causes material 6, to be reeled off to spool 7, at a rate of $\pi$ times the ground speed and fed into slot 10, in housing 11, until it passes around cylinder 12, and forms pipe 15, which is disposed in channel 17, formed in earth 18, by disc cutter 3, and mole 13. Cylinder 12, is slightly tapered to the rear and is provided with nonslip surface 20, to grab material 6.

Drive mechanism 5, also drives cylinder 12, via chain 21, which wraps around sprocket 22.

Chain driven cutter device 23, is provided to periodically cut material 6, parallel to corrugations to control needed or maximum length of pipe 15, carried and driven by cylinder 12. Simultaneous with the cut being made is the insertion of short sections of sheet material to form splices 19, at the cuts. In this manner the sections are coupled by a rotatable joint as shown functionally in FIG. 7.

Conventional lift mechanism 24, is provided to disengage wheel 4, and lift device at the end of a run.

It should be understood that changes and modifications in the form, construction, arrangement, and combination of the corrugated pipe fabricator and installer device and methods of making and using the same may be made and substituted for those herein shown and described without departing from the nature and principle of my invention.

Having thus described my invention, what I claim is new and desire to secure by United States Letters Patent is:

1. A corrugated pipe fabricator and installer device comprising,
   frame means,
   a mole plow operably mounted on the frame means, said mole plow provided with an upper portion and base portion,
   a rotating cylinder operably coupled to said mole plow, and disposed in the base portion of said mole plow,
   spool means operably mounted on said frame means,
   roller means operably mounted on said frame means,
   corrugated sheet material mounted on said spool means and passed between said roller means and then passed about said rotating cylinder, driving means for rotating said spool means, said roller means and said rotating cylinder operably mounted on said frame means.

2. A corrugated pipe fabricator and installer device as described in claim 1 wherein said sheet material is fed onto said rotating cylinder at an angle other than 90 degrees.

3. A corrugated pipe fabricator and installer device as described in claim 2 wherein the angle between the axis of rotation of the rotating cylinder and a longitudinal edge of the sheet material is Arctan $\pi$.

4. A corrugated pipe fabricator and installer device as described in claim 2 wherein the angle between the axis of rotation of the spool means is Arctan $\pi$.

5. A corrugated pipe fabricator as described in claim 1 provided with roller means, wherein said driving means causes said spool to rotate causing said sheet material to pass from said spool and between said roller means which cause said sheet material to pass around said cylinder.

* * * * *